US00RE39979E

(19) United States
(12) Reissued Patent
Niwa

(10) Patent Number: US RE39,979 E
(45) Date of Reissued Patent: Jan. 1, 2008

(54) COLOR WHEEL INCLUDING LIGHT DEFLECTING MEANS

(75) Inventor: Shinichi Niwa, Fukuroi (JP)

(73) Assignee: Minebea Co., Ltd., Kitasaku-gun (JP)

(21) Appl. No.: 11/311,888

(22) Filed: Dec. 20, 2005

Related U.S. Patent Documents

Reissue of:
(64) Patent No.: 6,885,512
Issued: Apr. 26, 2005
Appl. No.: 10/848,138
Filed: May 19, 2004

(30) Foreign Application Priority Data

Jun. 6, 2003 (JP) ..... 2003-162474

(51) Int. Cl.
*G92B 5/22* (2006.01)

(52) U.S. Cl. ..... 359/891; 359/885; 348/743; 356/418; 362/293

(58) Field of Classification Search ..... 359/891, 359/892, 885; 348/743; 356/418; 362/293
See application file for complete search history.

(56) References Cited

U.S. PATENT DOCUMENTS

| | | | | |
|---|---|---|---|---|
| 5,257,332 | A | 10/1993 | Pimpinella | |
| 4,800,474 | A | 1/1999 | Bornhorst | |
| 5,868,482 | A | 2/1999 | Edlinger et al. | |
| 6,011,662 | A | 1/2000 | Evans | |
| 6,024,453 | A | 2/2000 | Edlinger et al. | |
| 6,574,046 | B1 * | 6/2003 | Shioya | 359/618 |
| 6,702,446 | B2 | 3/2004 | De Vaan et al. | |
| 6,715,887 | B2 | 4/2004 | Chang | |
| 6,813,087 | B2 | 11/2004 | Davis | |
| 2002/0005914 | A1 | 1/2002 | Tew | |
| 2002/0105729 | A1 | 8/2002 | Richards et al. | |
| 2003/0142241 | A1 * | 7/2003 | Allen et al. | 348/742 |
| 2004/0095767 | A1 | 5/2004 | Ohmae et al. | |
| 2005/0018145 | A1 | 1/2005 | Kwon et al. | |

FOREIGN PATENT DOCUMENTS

| | | |
|---|---|---|
| JP | 2003-057424 | 2/1903 |
| JP | 03-122903 | 5/1991 |
| JP | 05-090391 | 4/1993 |
| JP | 06-347639 | 12/1994 |
| JP | 10-048542 | 2/1998 |
| JP | 11-115711 | 4/1999 |
| JP | 11-222664 | 8/1999 |
| JP | 2000-239830 | 9/2000 |
| JP | 2001-073136 | 3/2001 |
| JP | 2003-050309 | 2/2003 |
| JP | 2004-101827 | 4/2004 |
| WO | WO 94/25796 | 11/1994 |

* cited by examiner

*Primary Examiner*—Leonidas Boutsikaris
(74) *Attorney, Agent, or Firm*—Oliff & Berridge, PLC

(57) ABSTRACT

A color wheel includes lens structures, which are formed on a surface of a substrate opposite to a surface having filter sectors, and which have curved surfaces formed at their abutting ends and positioned along a boundary between adjacent filter sectors. Light impinging on an area of the substrate corresponding to the boundary is deflected due to one of the curved surfaces so as to be surely guided into one of the adjacent filter sectors and to be duly dispersed into a predetermined color, whereby light can be efficiently utilized.

9 Claims, 6 Drawing Sheets

COLOR WHEEL INCLUDING LIGHT DEFLECTING MEANS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a color wheel suitable for use as a filter element of a time-share light dispersing device, and to a color wheel incorporated in a color wheel assembly making up a projection-type image display apparatus.

2. Description of the Related Art

Color composition in a projection-type image display apparatus has conventionally been accomplished commonly by a method, such as: a single-panel method, in which one light valve element adapted to control light amount per pixel thereby creating an image is used to disperse each pixel into red (R), green (G), and blue (B) lights; and a three-panel method, in which three light valve elements dedicated to R, G and B lights, respectively, are used to produce in parallel R, G and B images, and then the three images thus produced are composed. Recently, as a light valve element capable of fast switching, such as a ferroelectric liquid crystal display element or a digital micro mirror device, is increasingly coming into practical use, a time-sharing single-panel method is widely used. In the time-sharing single-panel method, R, G and B lights are caused to sequentially impinge on one light valve element, the light valve element is driven in synchronization with switching-over of the R, G and B lights thereby producing R, G and B images in a time series manner, and the images thus produced are projected onto a screen, or the like. Here, color composition of the images is accomplished by a viewer due to an afterimage effect occurring at a sense of vision. In the time-sharing single-panel method, reduction in both dimension and weight of the apparatus, which is a feature of a single-panel method, can be achieved by employing a relatively simple optical system, and therefore the time-sharing single-panel method is favorable for realizing inexpensive fabrication of a projection-type image display apparatus. In such an image display apparatus, a color wheel is preferably used as a filter element of a time-share light dispersing device to sequentially disperse light emitted from a white light source into R, G and B lights having respective wavelength bands in a time-sharing manner (refer to, for example, Japanese Patent Application Laid-Open No. H06-347639).

FIGS. 7A and 7B are respectively front and side views of a typical color wheel assembly incorporating such a color wheel. Referring to FIG. 7B, a color wheel assembly 200 comprises a color wheel 100, a hub 105, and a motor 106. The color wheel 100 is a tricolor color wheel structured such that a disk-like substrate 101, which is made of a light-transmitting material, for example, optical glass, has three filter sectors 102, 103 and 104 formed on one surface thereof, and such that, for example, the filter sector 102 transmits R light only, the filter sector 103 transmits G light only, and the filter sector 104 transmits B light only. The color wheel 100 thus structured is fixedly attached to the motor 106 via the hub 105 coaxially therewith. The color wheel assembly 200 operates such that the color wheel 100 is rotated by the motor 106 so that the filter sectors (R, G and B) 102, 103 and 104 sequentially have white light S falling incident thereon whereby the white light S is sequentially dispersed into R, G and B lights.

FIG. 8A is a plan view of the aforementioned color wheel 100, and FIG. 8B is a schematic cross-sectional view taken along a line A-A' of FIG. 8A. The filter sectors 102, 103 and 104 are usually constituted by optical interference filters of dielectric multi-layer films structured such that a dielectric thin film formed of a material having a high refractive index (e.g., $TiO_2$, $ZrO_2$, and ZnS), and a dielectric thin film formed of a material having a low refractive index (e.g., $SiO_2$, and $MgF_2$) are alternately laminated by an evaporation method, a sputtering method, or the like. The optical interference filter is superior in durability (heat resistance, light stability, and chemical resistance) to a color filter formed by a staining method, a pigment dispersion method, or the like, has a high transmittance, and readily achieves a sharp spectroscopic characteristic, and therefore endures exposure to intensive light flux and produces a high display quality image.

Adjacent filter sectors are required to abut each other precisely and tightly unless achromatic areas which do not constitute any filter sectors are intentionally disposed. This is because if the adjacent filter sectors do not abut each other precisely and tightly, a gap is generated between the adjacent filter sectors, and light passing the gap fails to definitely determine its color thus resulting in not fully contributing to forming an image. When filters are formed by an evaporation method or a sputtering method, a metal mask formed of a metallic thin plate and having openings corresponding to the filter sectors is preferably used for demarcating the filter sectors. The metal mask is first guided mechanically, for example, with a positioning pin, and then finally lined up by viewing, for example, through a microscope, the peripheries of filter sectors of one kind already formed and the openings of the metal mask.

However, the following problem is found in the positioning technique described above. It occasionally happens at the process of forming the filter sectors due to the thickness of the metal mask that as shown in FIG. 8B, dielectric multi-layer films constituting the filter sectors 102, 103 and 104 (103 not shown in FIG. 8B) fail to achieve a predetermined thickness at regions F which extend along the outlines of the openings of the metal mask, and which measure up to about 100 μm in width. In such a case, it is difficult to clearly determine the demarcation of the filter sectors even by viewing through a microscope, and this hinders precise alignment of the openings to the filter sectors. Consequently, the filter sectors thus formed are positioned with respect to one another with a lowered degree of accuracy, and an incomplete filter portion E is inevitably found, for example, between the filter sectors 102 and the filter sectors 104 as shown in FIG. 8B. Referring to FIG. 9, out of light rays A to D passing the incomplete filter portion E, the light rays A and D may possibly contribute to forming an image but the light rays B and C definitely fail to do so.

In order to overcome the problem, for example, Japanese Patent Application Laid-Open No. H11-222664 discloses a metal mask with openings, in which the sidewalls of the openings are inclined with respect to the metal mask surfaces such that the openings have an increased area at one of the surfaces facing an evaporation source so that particles from the evaporation source come into the openings with reduced restriction thereby better achieving uniform film formation within the openings.

The aforementioned Japanese Patent Application Laid-Open No. H06-347639 discloses that filter sectors are desired to abut each other unless achromatic areas which do not constitute any filter sectors are intentionally disposed, but does not teach how it can be achieved. Also, the aforementioned Japanese Patent Application Laid-Open No.

H11-222664 indicates a method that is anticipated to be good to a certain degree for clearly demarcating a boundary between filter sectors provided that an optimum inclination angle of the sidewalls surely exists and can be obtained somehow which allows a film to be formed uniform in thickness all the way up to the peripheries of filter sectors. The optimum inclination angle of the sidewalls, however, must be obtained theoretically and experimentally based on various considerations, such as a film material method and conditions of film formation, a desired film thickness, a metal mask thickness, and the like, and therefore the method disclosed therein cannot be readily applied to fabrication of a color wheel.

SUMMARY OF THE INVENTION

The present invention has been made in light of the above problems, and it is an object of the present invention to provide a color wheel, in which light impinging on an area corresponding to a boundary between adjacent filter sectors can be efficiently utilized even if the adjacent filters are not precisely positioned with respect to each other, and which is incorporated in a color wheel assembly for use in an image display apparatus.

In order to achieve the object, according to a first aspect of the present invention, a color wheel comprises: a disk-like substrate made of a light-transmittable material; plural kinds of filter sectors formed on a surface of the substrate and functioning to selectively transmit lights having respective different wavelength bands; and a plurality of light deflecting means to change an optical path of light impinging on an area corresponding to a boundary between adjacent filter sectors so as to guide the light into one of the adjacent filter sectors. Consequently, light impinging on the area corresponding to the boundary between the adjacent filter sectors can be surely dispersed into a predetermined color, even if the boundary is not provided with a complete dielectric multi-layer film having a specified thickness, or even if the adjacent filter sectors are not precisely positioned with respect to each other.

In the first aspect of the present invention, the light deflecting means may be lens structures formed integrally with the substrate. Consequently, the light deflecting means can be formed precisely by using a usual method for fabricating an optical element.

In the first aspect of the present invention, substrate may consist of a lower refractive index portion and a higher refractive index portion, and the light deflecting means may be lens structures constituted by the higher refractive index portion. Consequently, the color wheel has flat surfaces, and therefore does not cause an increased noise wind level due to its high-speed rotation.

According to a second aspect of the present invention, the color wheel, together with a motor to rotate the color wheel, may comprise a color wheel assembly. Consequently, the color wheel assembly can utilize white light efficiently.

According to a third aspect of the present invention, the color wheel assembly composed of the color wheel may be employed in an image display apparatus. Consequently, the image display apparatus can provide a display image of a high visual quality due to the efficient utilization of white light.

BRIEF DESCRIPTION OF THE DRAWINGS

FIG. 2B is a schematic cross-sectional view thereof taken along a line A-A' in FIG. 3A;

DESCRIPTION OF THE PREFERRED EMBODIMENTS

The present invention will hereinafter be described with reference to the accompanying drawings.

Figure 1A:
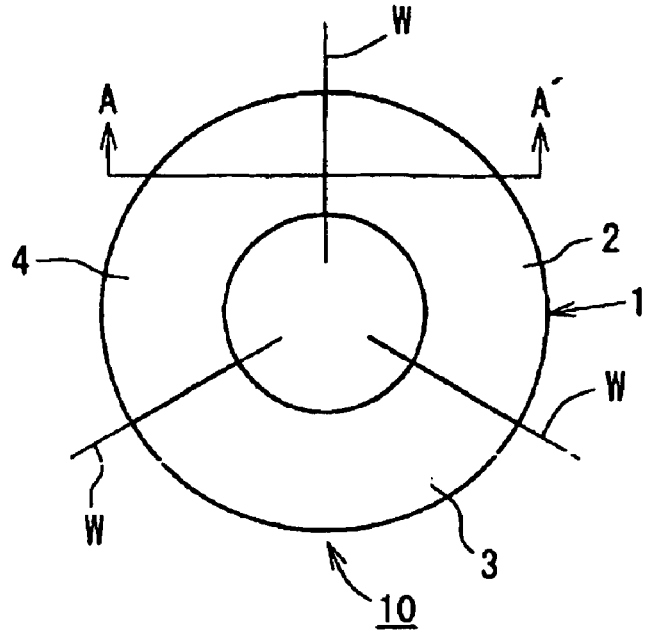
FIG. 1A is a plan view of a color wheel according to a first embodiment of the present invention.

A first embodiment of the present invention will be described with reference to FIGS. 1A and 1B. Referring to FIG. 1A, a color wheel 10 is structured such that filter sectors 2, 3 and 4 are formed on one surface of a disk-like substrate 1 made of a light-transmittable material, such as glass, resin, and the like. The filter sectors 2, 3 and 4 are well-known optical interference filters which are composed of a dielectric multi-layer film formed by an evaporation method, a sputtering method, and the like. The filter sectors 2 are R transmitting filters to transmit R light only, the filter sectors 3 are G transmitting filters to transmit G light only, and the filter sectors 4 are B transmitting filters to transmit B light only. The light-transmittable material for the substrate 1 may preferably be, for example, optical glass such as borosilicic acid glass, or optical plastic such as polymethyl methacrylate, polycarbonate, and polycyclic olefin. Indicated by lines W in FIG. 1A are ideal demarcation lines in designing.

Figure 1B:
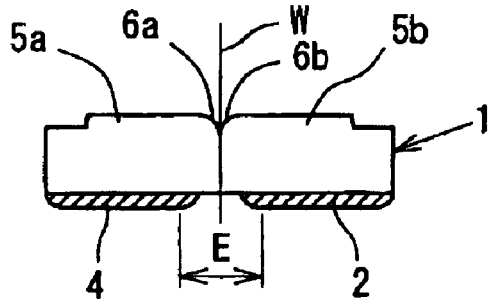
FIG. 1B is a schematic cross-sectional view thereof taken along a line A-A' in FIG. 1A.

Referring to FIG. 1B, the substrate 1 has lens structures 5a, 5b as light deflecting means formed on a surface thereof opposite to a surface on which the filter sectors 2, 3 and 4 are formed. The lens structures 6a, 5b are formed integrally with the substrate 1 by a manufacturing method to be described later so as to be positioned along the ideal demarcation line W supposedly located at the center of an incomplete filter portion E, and have respective curved surfaces 6a, 6b formed at their abutting ends and configured to be substantially symmetric about the ideal demarcation line W. The abutting ends of the lens structures 5a, 5b in FIG. 1B are configured to be convex (see 6a, 6b), but may be configured to be concave, or alternatively may be plane with inclination. FIG. 1B shows only the lens structures 5a, 5b formed at the ideal demarcation line W between the filter sectors 2 and 4, but such lens structures (5a, 5b) are also formed respectively at the ideal demarcation line W between the filter sectors 2 and 3 and at the ideal demarcation line W between the filter sectors 3 and 4.

Figure 2:
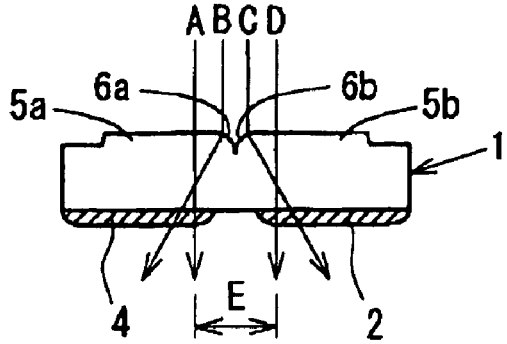
FIG. 2 is an explanatory view of optical paths of light rays incident on the color wheel shown in FIGS. 1A and 1B.
Figure 9:
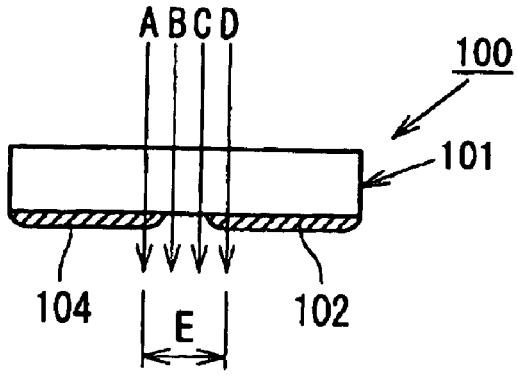
FIG. 9 is an explanatory view of optical paths of light rays incident on the conventional color wheel shown in FIGS. 8A and 8B.

Referring FIG. 2, light rays B and C, which impinge on an area corresponding to the incomplete filter portion E, and conventionally travel straight thus failing to be duly dispersed (refer to FIG. 9), have now their optical paths changed by means of the curved surfaces 6a, 6b of the lens structures 6a, 5b toward the filter sectors 4 and 2, respectively, to be surely dispersed into B and R lights.

The lens structures 5a, 5b are formed integrally with the substrate 1 by using a glass or resin processing technique with a high accuracy, that is employed for fabricating an optical element, such as a lens or a diffraction grating, or fabricating a substrate of an optical information recording medium, such as a CD or a DVD. Specifically, the lens structures 5a, 5b can be preferably formed, in case of the substrate 1 made of a glass material, by, for example, hot press-molding, and in case of the substrate 1 made of a resin material, by die-forming (e.g., casting, injection-molding, and compression-molding). Depending on the required dimension or optical properties such as a refractive index, the lens structures 5a, 5b may alternatively be formed separately from the substrate 1 and attached to the substrate 1 by adhesion, or formed such that a grooved is formed on the substrate 1 along the ideal demarcation line W by, for example, etching, and then the groove portion is heated up to a temperature exceeding its fusing or softening point thereby forming light deflecting surfaces. The lens structures 5a, 5b in FIG. 1B are raised relative to the surface of the substrate 1, but may alternatively be flush therewith such that the curved surfaces 6a, 6b are recessed relative thereto.

Figure 3A:
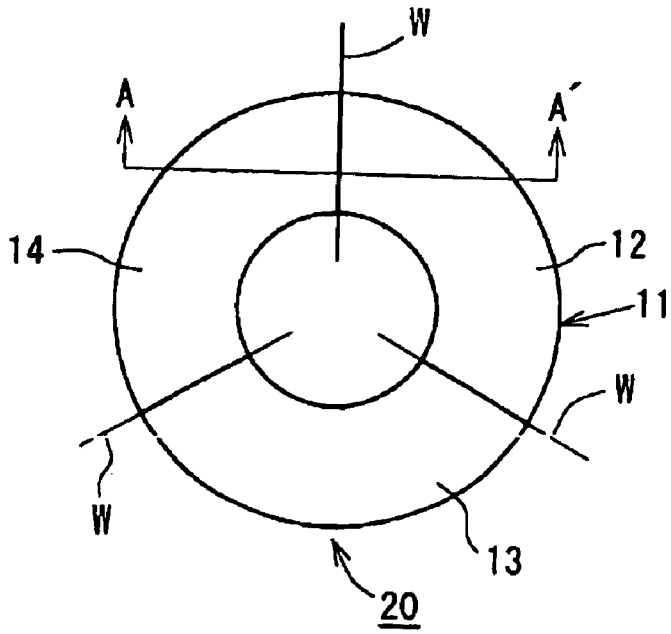
FIG. 3A is a plan view of a color wheel according to a second embodiment of the present invention.

A second embodiment of the present invention will be described with reference to FIGS. 3A and 3B. Referring to FIG. 3A, a color wheel 20 is structured such that filter sectors 12, 13 and 14 are formed on one surface of a disk-like substrate 11 made of a light-transmittable material, such as glass, resin, and the like. The filter sectors 12, 13 and 14 are well-known optical interference filters which are composed of a dielectric multi-layer film formed by an evaporation method, a sputtering method, and the like. The filter sectors 12 are R transmitting filters to transmit R light only, the filter sectors 13 are G transmitting filters to transmit G light only, and the filter sectors 14 are B transmitting filters to transmit B light only. Indicated by lines W in FIG. 3A are ideal demarcation lines in designing.

Figure 3B:
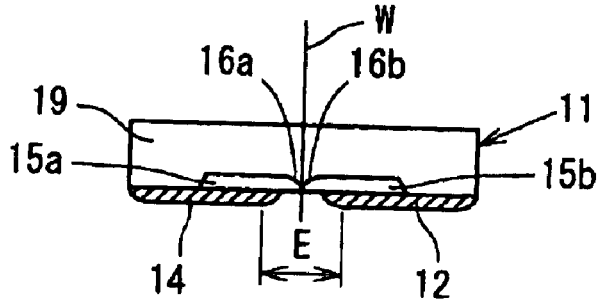

Referring to FIG. 3B, the substrate 11 is composed of a main portion 19 having a lower refractive index, and lens structures 15a, 15b having a higher refractive index and working as light deflecting means. The lens structures 15a, 15b are disposed at and flush with a surface having the filter sectors 12, 13 and 14 formed thereon, are positioned along the ideal demarcation line W supposedly located at the center of an incomplete filter portion E, and have respective curved surfaces 16a, 16b formed at their abutting ends and configured to be substantially symmetric about the ideal demarcation line W. The abutting ends of the lens structures 15a, 15b in FIG. 3B are configured to be convex (see 16a, 16b), but may be configured to be concave, or alternatively may be plane with inclination. The FIG. 3B shows only the lens structures 15a, 15b formed at the ideal demarcation line W between the filter sectors 12 and 14, but such lens structures (15a, 15b) are also formed respectively at the ideal demarcation line W between the filter sectors 12 and 13 and at the ideal demarcation line W between the filter sectors 13 and 14.

Figure 4:
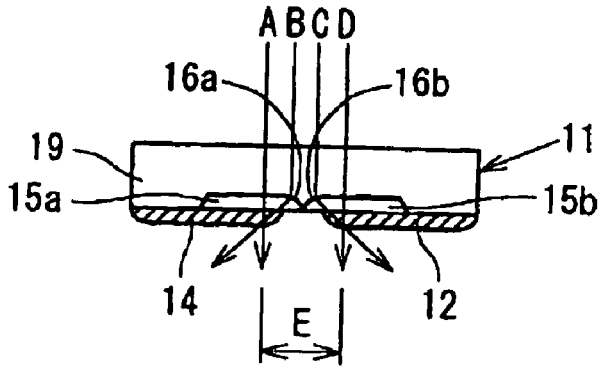
FIG. 4 is an explanatory view of paths of light rays incident on the color wheel shown in FIGS. 3A and 3B.

Referring FIG. 4, light rays B and C, which impinge on an area corresponding to the incomplete filter portions E, and conventionally travel straight thus failing to be duly dispersed (refer to FIG. 9), have now their optical paths changed by means of the curved surfaces 16a, 16b of the lens structures 16a, 15b toward the filter sectors 14 and 12, respectively, to be surely dispersed into B and R lights.

The substrate 11 may be formed such that a low refractive index material for the main portion 19 and a high refractive index material for the lens structures 15a, 15b are appropriately selected out of various optical glass or plastic materials taking design conditions into consideration, and are processed by, for example, insert-molding, which is used for fabricating a composite optical element and the like. For example, BK-type optical glass having a refractive index of about 1.5 may be selected as a low refractive index material, and LAK-type optical glass having a refractive index of about 1.7 may be selected as a high refractive index material. The lens structures 15a, 15b in FIG. 3B are disposed at and flush with a surface of the main portion 19 having the filter sectors 12, 13 and 14 formed thereon, but may alternatively be embraced by the main portion 19, or penetrate through the thickness of the main portion 19 according to the conditions of the manufacturing method.

Figure 5A:
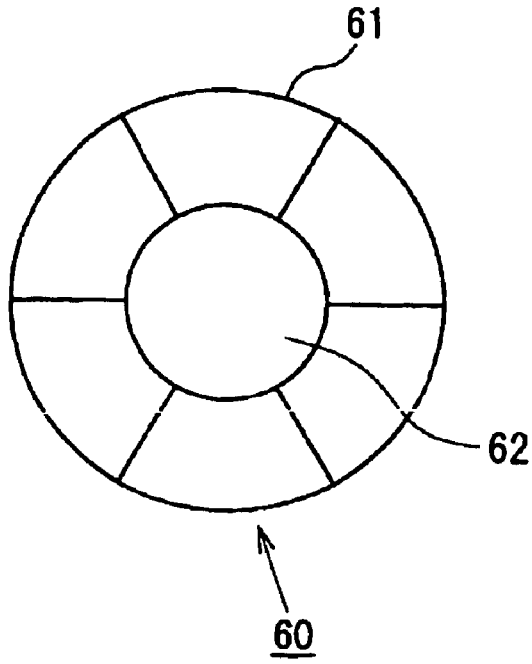
FIG. 5A is a front view of a color wheel assembly incorporating a color wheel according to the present invention.
Figure 5B:
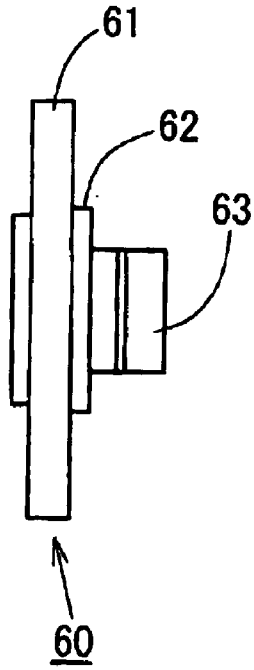
FIG. 5B is a side view thereof.

Now, a description will be made on a color wheel assembly incorporating a color wheel according to the present invention. Referring to FIGS. 5A and 5B, a color wheel assembly 60 comprises a color wheel 61, a motor 63 to rotate the color wheel 61, and a hub 62 for fixedly attaching the color wheel 61 onto the motor 63 such that the inner circumference of the color wheel 61 is fixed to the hub 62 by means of, for example, adhesive, and that the hub 62 and the motor 63 are fixedly attached to each other adhesively, or mechanically, e.g., screwing. The color wheel 61 may alternatively be fixed directly to the motor 61 without the hub 62 for example by sharing a common rotary shaft with the motor 61. The color wheel 61 is a bicolor or tricolor color wheel according to the present invention, specifically, has lens structures adapted to deflect lights incident on the area corresponding to the boundary between adjacent filter sectors.

Figure 6A:
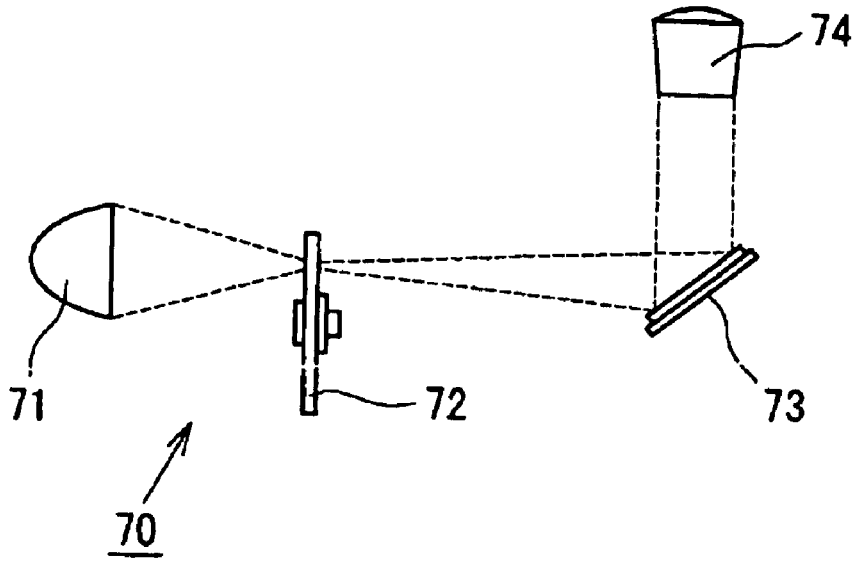
FIG. 6A is a construction view of a image display apparatus including a tricolor color wheel according to the present invention.

Further, a discussion will be made on an image display apparatus which includes a color wheel assembly incorporating a color wheel according to the present invention. Referring first to FIG. 6A, an image display apparatus 70 comprises: a white light source 71, such as a metal halide lamp; a color wheel assembly 72; a reflection-type light valve element 73, such as a digital micro mirror device; and a projection lens system 74. In the image display apparatus 70, the color wheel assembly 72 incorporates a tricolor color wheel which has lens structures as described in the embodiments of the present invention. White light emitted from the white light source 71 is dispersed by the color wheel assembly 72 sequentially into, for example, R light, G light and B light, impinges on the light valve element 73 and is thereby modulated sequentially into R, G and B images, which are then sequentially projected by the projection lens system 74 to be composed into a full color image.

Figure 6B:
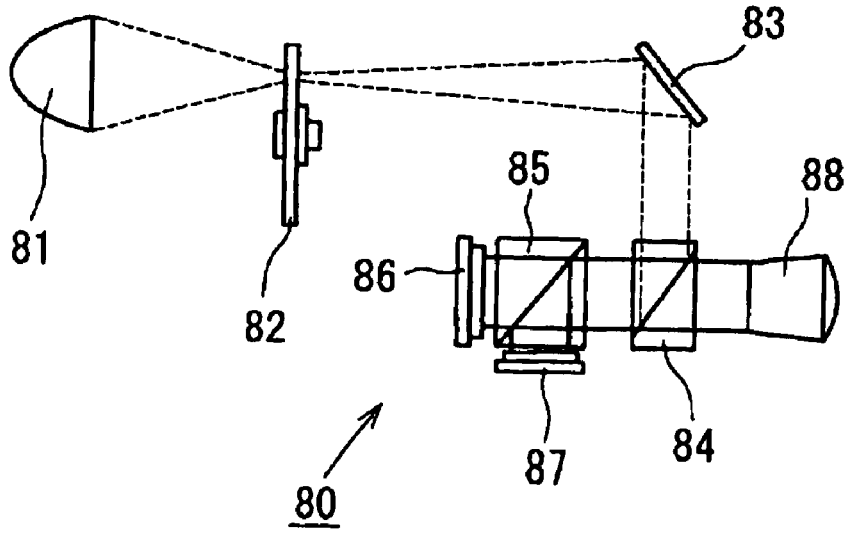
FIG. 6B is a construction view of an image display apparatus including a tricolor color wheel according to the present invention.
Figure 7A:
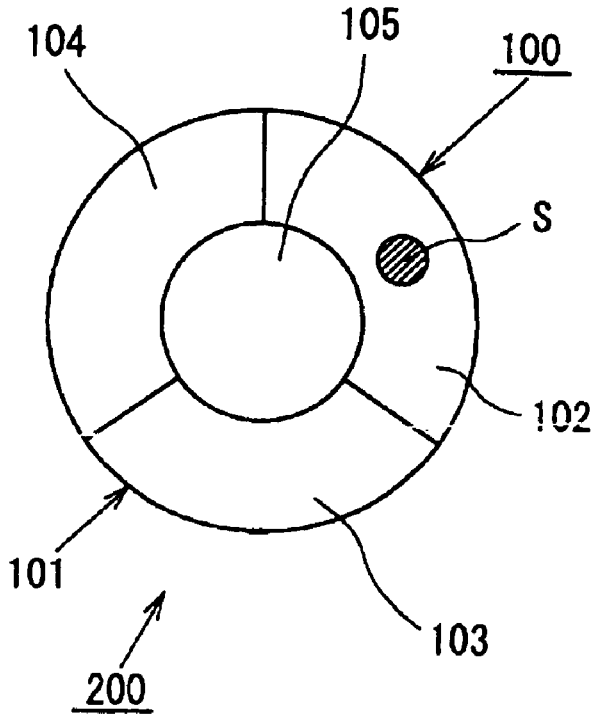
FIG. 7A is a front view of a typical color wheel assembly using a color wheel.
Figure 7B:
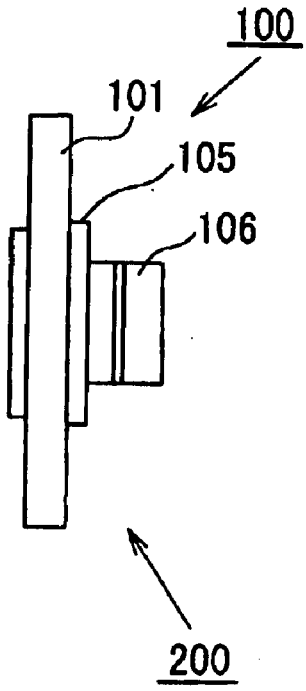
FIG. 7B is a side view thereof.
Figure 8A:
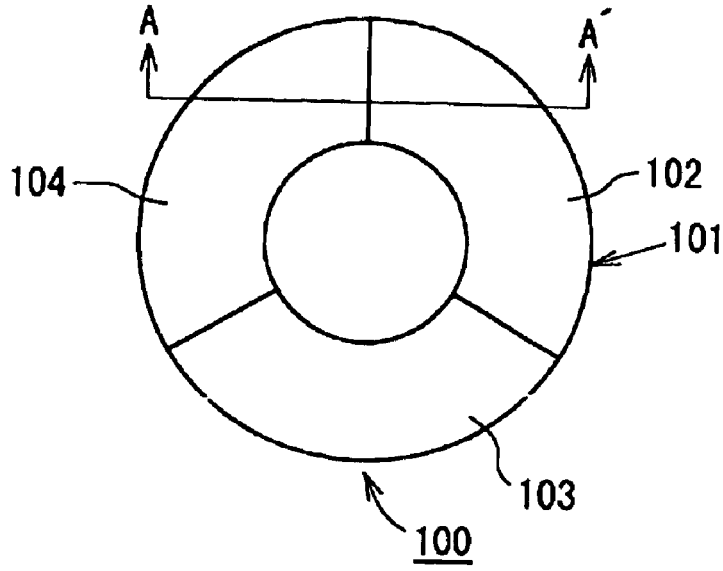
FIG. 8A is a plan view of a conventional color wheel.
Figure 8B:
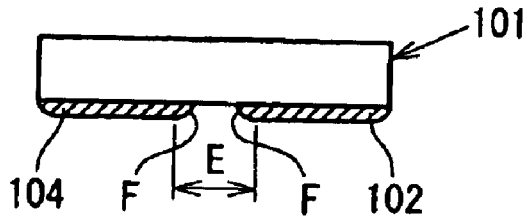
FIG. 8B is a schematic cross-sectional view thereof taken along a line A-A' in FIG. 8A.

Referring now to FIG. 6B, an image display apparatus 80 comprises: a white light source 81, such as a metal halide lamp; a color wheel assembly 82; a mirror 83; a total reflection prism 84; a dichroic prism 85; reflection-type light valve elements 86, 87, such as digital micro mirror devices; and a projection lens system 88. In the image display apparatus 80, the color wheel assembly 82 incorporates a bicolor color wheel which has lens structures as described in the embodiments of the present invention. White light emitted from the white light source 81 is dispersed by the color wheel assembly 82 sequentially into, for example, yellow (Y) light and magenta (M) light which have their travel direction changed by the mirror 83 and the total reflection prism 84, and impinge on the dichroic prism 85 which is adapted to transmit, for example, R light only, and to reflect light having other wavelength bands. The Y light impinging on the dichroic prism 85 is dispersed thereby into R and G lights which impinge on the light valve element 86 and then the light valve element 87 while the M light impinging on the dichroic prism 85 is dispersed into R and B lights which impinge on the light valve element 86 and then the light valve element 87. The light valve element 86 modulates the R light into an R image, and the light valve element 87 modulates the G and B lights into G and B images, respectively. The R and G images, and the R and B images impinge again on the dichroic prism 85 to be composed thereby into a Y image, and an M image, respectively, and the Y and M images pass through the total reflection prism 84 and are sequentially projected by the projection lens system 88 to be composed into a full color image.

It is evident that those skilled in the art may now make numerous modifications and variations without departing from the inventive concepts. For example, in the aforementioned image display apparatuses 70, and 80, respective light valve elements 73, and 86 and 87 are of reflection type, but may alternatively be of transmission type, such as liquid crystal light valves. Also, it is obvious that any optical systems or control systems can be optionally employed in the image display apparatuses 70, 80. Consequently, it is to be understood that the present invention is by no means limited to the specific embodiments described above but encompasses all changes and modifications which will become possible within the scope of the appended claims.

What is claimed is:

1. A color wheel comprising:

a disk-like substrate made of a light-transmittable material;

plural kinds of filter sectors formed on a surface of the substrate and functioning to selectively transmit lights having respective different wavelength bands; and a plurality of light deflecting means to change an optical path of light impinging on an area corresponding to a boundary between adjacent filter sectors so as to guide the light into one of the adjacent filter sectors, wherein the light deflecting means are lens structures formed integrally with the substrate.

2. A color wheel comprising:

a disk-like substrate made of a light-transmittable material;

plural kinds of filter sectors formed on a surface of the substrate and functioning to selectively transmit lights having respective different wavelength bands; and a plurality of light deflecting means to change an optical path of light impinging on an area corresponding to a boundary between adjacent filter sectors so as to guide the light into one of the adjacent filter sectors, wherein the substrate consists of a lower refractive index portion and a higher refractive index portion, and wherein the light deflecting means are lens structures constituted by the higher refractive index portion.

3. A color wheel according to claim 1, further comprising a motor arranged to rotate the color wheel.

4. A color wheel according to claim 3, further comprising an image display apparatus including the color wheel and the motor.

5. A color wheel according to claim 2, further comprising a motor arranged to rotate the color wheel.

6. A color wheel according to claim 5, further comprising an image display apparatus including the color wheel and the motor.

*7. The color wheel according to claim 1, wherein each of the lens structures includes a curved surface.*

*8. The color wheel according to claim 1, wherein the lens structures are raised relative to the surface of the substrate.*

*9. The color wheel according to claim 1, wherein the lens structures are flush with the surface of the substrate such that the at least one curved surface of the lens structures is recessed relative to the surface of the substrate.*

* * * * *